United States Patent
Jerg

(10) Patent No.: US 7,744,059 B2
(45) Date of Patent: Jun. 29, 2010

(54) VALVE ACTUATING DEVICE

(75) Inventor: Helmut Jerg, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 455 days.

(21) Appl. No.: 11/793,954

(22) PCT Filed: Oct. 25, 2005

(86) PCT No.: PCT/EP2005/055498

§ 371 (c)(1),
(2), (4) Date: Jun. 20, 2007

(87) PCT Pub. No.: WO2006/069835

PCT Pub. Date: Jul. 6, 2006

(65) Prior Publication Data

US 2008/0047620 A1 Feb. 28, 2008

(30) Foreign Application Priority Data

Dec. 23, 2004 (DE) .................. 10 2004 062 241

(51) Int. Cl.
*F16K 31/00* (2006.01)
*F16K 31/18* (2006.01)

(52) U.S. Cl. .................. 251/11; 251/129.01; 251/298; 251/303

(58) Field of Classification Search .................. 251/11, 251/129.01, 129.06, 298, 301, 303
See application file for complete search history.

(56) References Cited

U.S. PATENT DOCUMENTS

| 3,613,432 | A | * | 10/1971 | Wilson et al. ................. 72/402 |
| 4,884,780 | A | * | 12/1989 | Ohashi ........................ 251/11 |
| 5,865,418 | A | * | 2/1999 | Nakayama et al. ............. 251/11 |
| 6,494,225 | B1 | * | 12/2002 | Olewicz et al. ................ 137/1 |
| 7,182,101 | B2 | * | 2/2007 | Alacqua et al. ............. 137/875 |
| 2002/0108263 | A1 | | 8/2002 | Pahlke et al. |
| 2005/0109071 | A1 | | 5/2005 | Dirnberger et al. |

FOREIGN PATENT DOCUMENTS

| DE | 199 63 499 | 2/2001 |
| DE | 101 08 715 | 9/2002 |
| DE | 102 17 061 | 3/2003 |
| EP | 0 841 510 | 5/1998 |
| EP | 1 241 351 | 9/2002 |
| JP | 60-196482 | 10/1985 |
| JP | 4-351387 | 12/1992 |

OTHER PUBLICATIONS

International Search Report PCT/EP2005/055498.

* cited by examiner

*Primary Examiner*—John K Fristoe, Jr
(74) *Attorney, Agent, or Firm*—James E. Howard; Andre Pallapies

(57) ABSTRACT

A valve system includes a valve body arranged in a valve housing and actuatable via a shape-memory element that is movable from an undeformed rest state to a tension deformed state and is again transferred to the rest state. The valve system is improved by a force deflecting device that enables the shape-memory element to actuate the valve body exclusively during the transfer thereof to the tension or rest state.

21 Claims, 2 Drawing Sheets

VALVE ACTUATING DEVICE

The invention relates to a valve system comprising a valve body which is mounted in a valve housing which can be actuated by means of a shape memory element which can be transferred from an undeformed rest state via a deformed tension state back into the rest state and a water-carrying household appliance provided with such a valve system.

In numerous applications, in particular in water-carrying household appliances such as, for example, in washing machines or dishwashers, valves are used to switch large cross-sections having nominal widths greater than 10 mm. Valves known for this purpose operate today, for example, using direct-current or alternating-current magnets. These allow rapid actuation of the valve but, on the other hand however, provide only a small switching force for actuating the valve body. In particular, in the case of alternating-current magnets the problem additionally arises that vibrations occur in the coil as a result of the mains voltage applied to magnets. These vibrations cause an undesirable noise.

Thus, directly actuated valve systems are known as an alternative which use structural elements fabricated from so-called shape memory alloys to control the valve body. The shape memory (memory effect) of these alloys (memory metal) is based on a structural transformation of the alloy when a limiting temperature is exceeded or fallen below. As a result of the structural transformation, structural elements made of such alloys change their dimensions by up to 5% in the range of the limiting temperature. As a result, considerable actuating forces are activated. The actuating forces activated by the change in the crystal structure of the shape memory alloy are converted into an actuating movement of the valve.

In general two types of shape memory alloys are distinguished according to the type and manner of their elastic recovery. Firstly, there are shape memory alloys which after their deformation as a result of a limiting temperature being exceeded, do not deform back to their initial shape under their own force when the temperature drops below the limiting value. For re-use of structural elements made of such alloys, recovery must be reproduced by an externally applied force, for example, by a mechanical deformation. Since these shape-memory alloys only under temperature deformation in one direction, they are assigned to the so-called one-way type.

Shape memory alloys using the two-way effect also undergo deformation when the limiting temperature is exceeded. When the temperature drops below the limit, however, they recover their initial shape again. Another difference between the alloys using the one-way or two-way effect is that the force which actives a component using the one-way effect when the limiting temperature is exceeded is greater than that for components using the two-way effect. However, the restoring force required to restore the structural element after the one-way effect must be such that on the one hand, it is sufficient to restore the shape memory alloy when the temperature falls below the limit. On the other hand, however, it must not be so strong that it prevents the alloy from changing shape when the limiting temperature is exceeded.

A valve system with a shape memory element for actuating the valve body is known from DE 199 63 499 A1. The valve body there is pre-tensioned in a base position and can be shifted into a control position by means of an actuator. The actuator is fabricated as a shape memory element from a shape memory alloy. A control device for adjusting the temperature variation is associated with said actuator. Insofar as a shape memory element using the one-way effect is used, such a valve system comprises different contributions for the actuating forces of the valve in the opening or closing direction. This is because a greater force is generated in that direction in which the shape memory element moves the valve body as a result of a deformation compared with the opposite path in which a weaker spring must bring about the recovery of the shape memory element. In addition, the weaker restoring spring must counteract the counter-movement of the valve body and optionally a fluid pressure. However, if shape memory elements using the two-way effect are used, lower actuating forces must be accepted.

It is thus the object of the invention to provide a valve system which precisely switches large cross-sections without noise and a water-carrying household appliance with the advantages of this valve system.

This object is achieved according to the invention by a valve system of the type specified initially comprising a force deflecting device. With the aid of said device the shape memory element actuates both switching states of the valve either by transferring to its tension state or by transferring to the rest state. The invention thus departs from structures in which an opening or closing state of the valve is precisely assigned to the deformation or rest state of the shape memory element or conversely. Rather, it follows the principle of using the large force generated by a shape memory element in particular using the one-way principle for both switching processes of a valve, that is both for its opening and for its closing. This has the result that the large shape changing force of the shape memory element effects both valve movements and these can therefore be precisely controlled in the same way.

A prerequisite for this is that a force deflecting device is provided which makes this possible. Thus, a first embodiment of the invention can comprise a force deflecting device which converts a movement of the shape memory element in one actuating direction directly into a movement in directions of action opposite to one another. The actuating direction is to be understood in this case as that direction of movement in which the force from the shape transformation of the shape memory element or its oppositely directed restoring force acts, this being used to actuate the valve. The directions of action opposite to one another on the other hand are those directions in which a force acts for opening and for closing the valve. In principle, the force deflecting device can either switch the deformation force of the shape memory element as a result of the limiting temperature being exceeded or a separately applied restoring force in the case of a shape memory element using the one-way effect or the restoring force activated by the shape memory element itself as a result of falling below the limiting temperature according to the two-way effect. The deformation force of a shape memory element using the one-way effect is preferably used however since this has the largest magnitude.

A force deflecting device can be formed in various different ways. According to an advantageous embodiment of the invention, said device can comprise a link guide. It is thus a simple mechanism which is easy to assemble and therefore not very prone to error and requires only a small amount of space.

According to an alternative embodiment of the invention, the force deflecting device can consist of a lever mechanism. This has the advantage that it can be adjusted more accurately.

A plurality of shape memory elements are known to the prior art. These include so-called memory metals which are doped from alloys, for example, based on NiTi, Fe or Cu. In addition, plastics with shape memory properties are also known. In an advantageous embodiment of the invention, the shape memory element can be formed from a memory metal that can be deformed by heating. Preference is given to the memory metals or corresponding alloys because these are more durable and thus more rarely result in a failure of the valve.

The change in shape of the memory metal is usually brought about by supplying energy in the form of heat. In another advantageous embodiment of the invention, the heating can be effected by passing a current through the memory metal itself. This heating operates almost free from losses and effectively because it requires no energy conversion steps in a separate heating device.

The heating of a metal through which current flows is thus based on the fact that the metal offers a resistance to the current. According to a further particularly advantageous embodiment of the invention, a PTC can be used to control the heating. A PTC is a heating resistance which has a positive temperature coefficient. As the temperature increases, its resistance consequently increases. The heating again takes place as a result of a flow of current. The current only passes unhindered through the PTC for a short time until as a result of the heating the current flow encounters a certain resistance, optionally until the current flow is completely interrupted. A defined current pulse can consequently be specifically produced by suitably designing the PTC.

The invention makes use of this particular characteristic of the PTC in order to use this for particularly advantageous control of the heating of the shape memory element. This is because an actuating current with a relatively high current intensity is desired to activate the shape memory element. A large and rapid change in shape can thus be achieved. However, if a current of this intensity is applied to the shape memory element for a longer period of time, it can be damaged. Thus, the duration of action of the actuating current must be limited. An actuating pulse must thus be generated which the shape memory element can withstand free from damage over many actuations. The actuating pulse can lie between a current intensity of about 3 to 6 A and act over a duration of 100 to 500 ms. A corresponding pre-switched PTC now provides for such limitation of the current flow or for an actuating pulse. It generates this pulse by allowing a current of the required intensity to pass for only a short time in the manner described previously. Consequently, by using a PTC, complex control to produce a defined current pulse becomes superfluous.

According to the invention, the valve system described above can be installed in a water-carrying household appliance, in particular a dishwasher.

The principle of the invention is explained in detail hereinafter with reference to the drawings as an example. In the figures.

Figure 1:
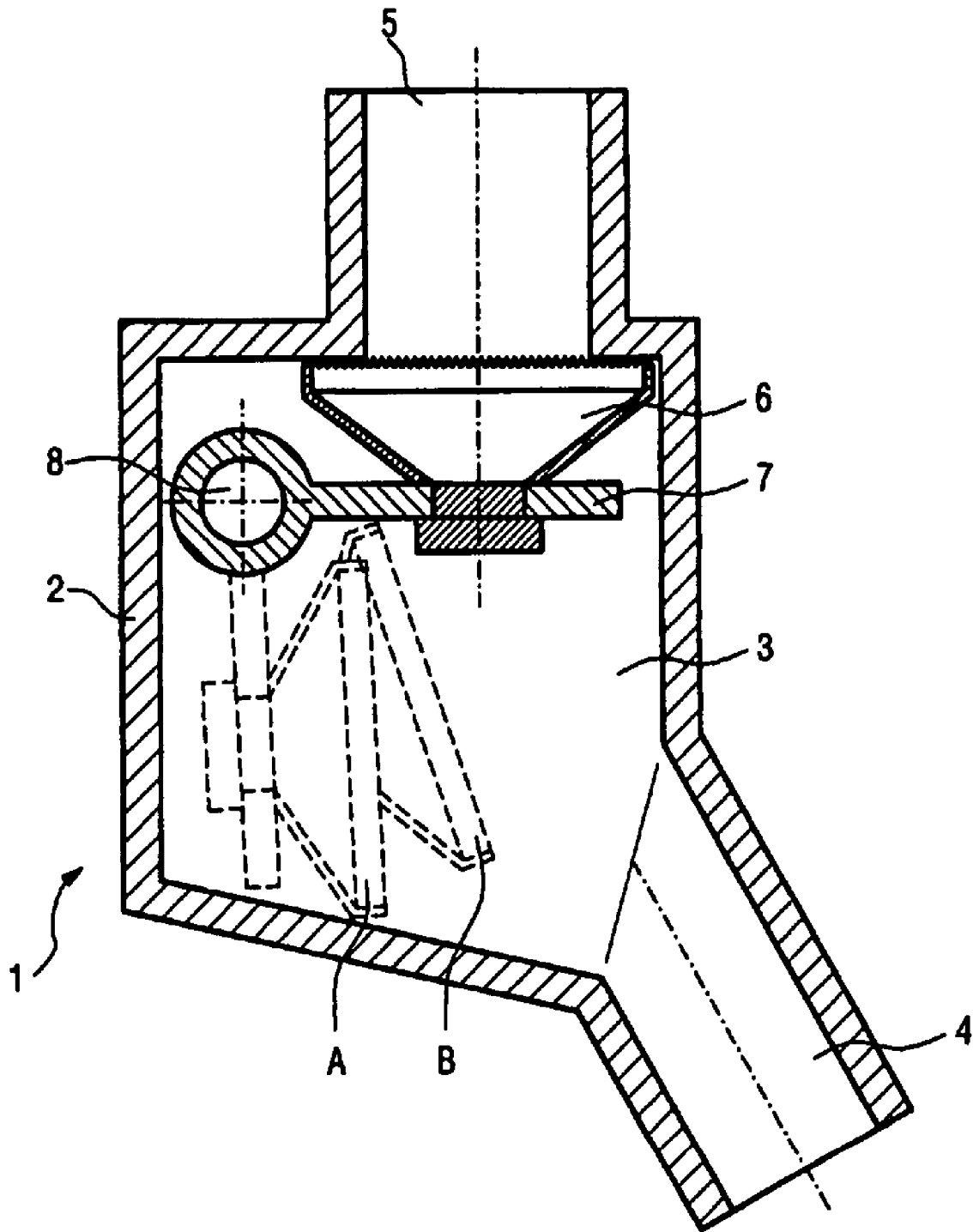
FIG. 1 is a section through a valve.

FIG. 1 shows an example of a switchable valve 1 according to the invention. This comprises a valve housing 2 which comprises a valve chamber 3 and one connecting piece for an inlet 4 and an outlet 5. In the valve chamber 3 a valve body 6 is arranged on an arm 7 which is rotatably mounted on an axis 8. The valve body 6 can be transferred on its arm 7 from a closure position shown in FIG. 1 via a first operating position A shown by dashed lines into an open position B also shown by dashed lines. The operating position A represents the maximum deflection of the valve body 6 in the opening direction and is only temporarily adopted during actuation. The open position B on the other hand represents the rest position of the valve body B in the open state of the valve 1.

Figure 2:
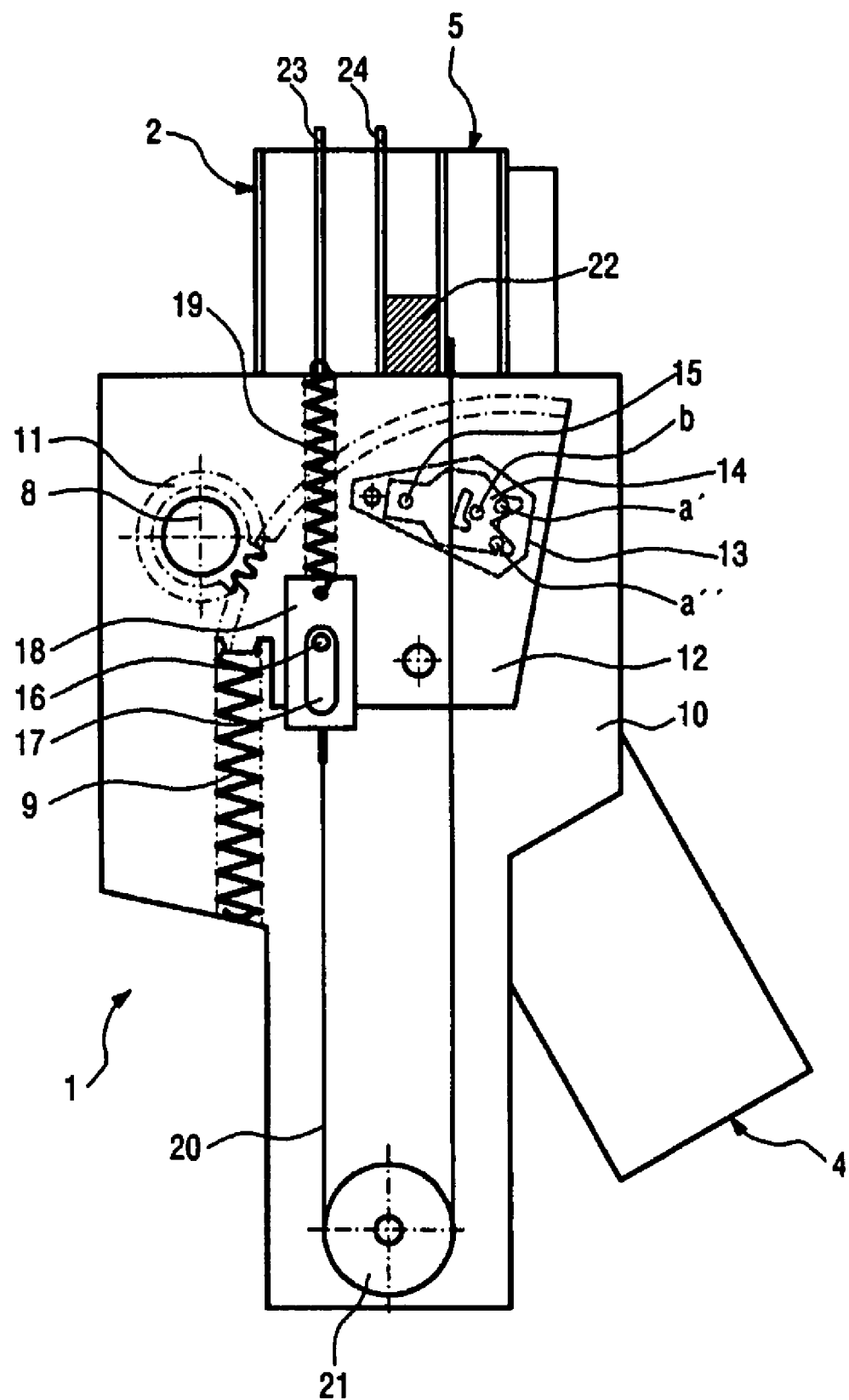
FIG. 2 is a force deflecting device of the valve according to FIG. 1.

FIG. 2 reproduces a force deflecting device for actuating the valve 1. Accordingly, the axis 8 passes through a housing cover 10 and has a pinion 11 above the housing cover 10. The pinion 11 engages with the teeth of a circular-segment-shaped disk 12 which is rotatably mounted on the housing cover 10. A recoil spring 9 acts on the disk 12, applying pressure to the disk 12 in the clockwise direction and being supported on the housing 2. Located between the disk 12 and the housing cover 10 is a heart-shaped cam 13 which is mounted on the disk 12 and can rotate with respect to said disk. When the disk 12 rotates, the heart-shaped cam 13 is consequently moved with said disk. It is held in the base position shown by means of springs which are not shown. This comprises a pivoted link 14 into which a cam follower 15 fixed on the housing cover 10 engages. During a movement of the disk 12 the cam follower 15 is consequently moved relative to the heart-shaped cam 13 inside the pivoted link 14.

Alternatively, the heart-shaped cam 13 can be connected to the disk 12, for example on its rear side so that it is fixed in the housing. The cam follower 15 should then be mounted so that it can move. It can be guided in a slit on the housing cover 10 so that it can be moved during a movement of the disk 12 transversely thereto inside the pivoted link 14.

A pin 16 is also firmly connected to the disk 12 and engages in an oblong hole 17 of an elongated connecting lug 18. One end of a tension spring 19 acts on one narrow side of the connecting lug 18, the other end being secured in a counter-bearing on the housing 2. A wire 20 of memory metal as a shape memory element is fastened on the opposite narrow side of the connecting lug 18, This is guided on a deflecting roller 21 likewise rotatably mounted on the housing cover 10 and its other end adjoins the heating resistor 22 arranged on the housing 2. The heating resistor 22 lies in a current circuit between a first contact tag 23 on one side and the wire 20, the connecting lug 18, the tension spring 19 and a second contact tag 24 on the other side. During operation current therefore flows through the components 23, 20, 22, 24.

The valve 1 is located in the same closure position as in FIG. 1 in the position shown in FIG. 1. To actuate the valve 1, a current is now applied to the contact tags 23, 24. The heating resistor 22 through which current flows then brings about a specific actuating pulse for heating the wire 20. As a result of the short, strong heating, the wire 20 is shortened and thus moves the connecting lug 18 in the direction of the deflecting roller 21. In this case, the connecting lug 18 entrains the pin 16 on the disk 12. It turns the disk 12 anticlockwise so that the closing spring 9 is compressed.

The rotation of the disk 12 is passed on to the pinion 8 so that the arm 7 together with the valve body 6 lifts from the connecting piece of the outlet 5 and is transferred in the anticlockwise direction into the actuating position A (FIG. 1). As a result of the rotary movement of the disk 12, the cam follower 15 which is fixed with respect to the housing cover 10 migrates inside the pivoted link 14 of the heart-shaped cam 13 into the actuating position a'.

After any further current supply had been stopped and the heating had decayed in consequence, the tensile force in the wire 20 which had resulted in its shortening is relaxed. The tension spring 19 now acts in the opposite direction and stretches the wire 20 back to its original length. In this case, the disk 12 turns in the clockwise direction and thus back towards its initial position. However, whilst the wire 20 can again adopt its initial position as a result of the oblong hole 17 in the connecting lug 18, the disk 12 is prevented from doing this by the cam follower 15 since this is now forced into the intermediate position b inside the pivoted link 14 by the heart-shaped cam 13. This prevents the disk 12 from turning completely back so that the arm 7 only takes part of its return path and stays in an open position B. Thus, the path between the inlet 4 and the outlet 5 inside the valve is opened without a force needling to act permanently to maintain the open position B.

As a result of a new current pulse via the contact tags 23, 24, the heating resistor 22 is heated again, resulting in shortening of the wire 20 again. This cause the disk 12 to turn anticlockwise. The renewed turning of the disk 12 transfers the arm 7 and with this the valve body 6 back into the actuating position A which corresponds to a second actuating position a" of the cam follower 15 inside the pivoted link 14. This second actuating position a" differs from the first actuating position a' in that during the subsequent cooling of the wire, its lengthening as a result of the tension spring 19 and the resulting rotation of the disk 12 in the clockwise direction, the disk 12 can return completely to the initial position shown in FIG. 2. Thus, the arm 7 and with this the valve body 6 again occupy the closure position of the valve 1 shown in FIG. 1.

The valve according to the invention can be used in a water-carrying household appliance, in particular a dishwasher or washing machine, for any purpose, for example, for controlling the flow in a pressurised pipe with cleaning fluid or for metering liquid cleaning agent and clear rinse in particular.

Finally, it is also noted that the valve described hereinbefore in detail is merely an exemplary embodiment which can be modified by the person skilled in the art in various ways without departing from the scope of the invention. Thus, a heating resistor can be omitted if a wire having shape changing properties is used instead, which optionally has current passed directly through it with a transformer connected in front thereof and is thereby heated.

Other force deflecting devices are also feasible, for example, those in which a translational movement of a shape memory element in one direction is converted, for example, by means of an intermittent mechanism into an actuating movement oriented in two directions. Furthermore, a translational actuating movement can also be provided for actuating the valve instead of a rotary movement.

For the sake of completeness it should also be noted that the use of the indefinite article "a" does not exclude the fact that the relevant features can also be multiply present.

REFERENCE LIST

1 Valve
2 Valve housing
3 Valve chamber
4 Inlet
5 Outlet
6 Valve body
7 Arm
8 Axis
9 Recoil spring
10 Housing cover
11 Pinion
12 Disk
13 Heart-shaped cam
14 Pivoted link
15 Cam follower
16 Pin
17 Oblong hole
18 Connecting lug
19 Tension spring
20 Wire
21 Deflecting roller
22 Heating resistor
23 Contact tag
24 Contact tag

The invention claimed is:

1. A valve system comprising:
a valve body mountable in a valve housing, the valve body being movable between a valve closing position in which the valve body is disposed for assisting in the closure of a valve opening and a valve open position in which the valve body is disposed for permitting passage of a fluid through the valve opening;
a shape memory element for assisting in the movement of the valve body between its valve closing position and its valve open position, the shape memory element having the property that it will cycle through a transformation in which it transfers from an undeformed rest state into a deformed tension state and thereafter transfers from the deformed tension state back into the undeformed rest state; and
a force deflecting device, the force deflecting device and the shape memory element cooperatively operating with one another to effect movement of the valve body between its valve closing position and its valve open position with the shape memory element assisting in a movement of the valve body between its valve closing position and its valve open position only during a selected one of a transformation of the shape memory element in which it transfers from its undeformed rest state into its deformed tension state and a transformation of the shape memory element in which it transfers from its deformed tension state back into its undeformed rest state and the force deflecting device operating without the assistance of the shape memory element to maintain the valve body in both its valve closing position and its valve open position.

2. The valve system according to claim 1, wherein the force deflecting device converts a movement in an actuating direction of the shape memory element directly into a movement in oppositely directed directions of action.

3. The valve system according to claim 2, wherein the force deflecting device comprises a pivoted link guide.

4. The valve system according to claim 2, wherein the force deflecting device comprises a lever device.

5. The valve system according to claim 1, wherein the shape memory element is a memory metal.

6. The valve system according to claim 5, wherein current can be passed through the memory metal for heating the memory metal.

7. The valve system according to claim 5, wherein a heating resistor is used to control heating of the memory metal.

8. A water-carrying household appliance comprising:
an assembly in which a fluid is retained;
a valve body mountable in a valve housing, the valve body being movable between a valve closing position in which the valve body is disposed for assisting in the closure of a valve opening such that fluid retained in the assembly cannot flow beyond the valve body and a valve open position in which the valve body is disposed for permitting passage of a fluid through the valve opening;
a shape memory element for assisting in the movement of the valve body between its valve closing position and its valve open position, the shape memory element having the property that it will cycle through a transformation in which it transfers from an undeformed rest state into a deformed tension state and thereafter transfers from the deformed tension state back into the undeformed rest state; and a force deflecting device, the force deflecting device and the shape memory element cooperatively operating with one another to effect movement of the valve body between its valve closing position and its valve open position with the shape memory element assisting in a movement of the valve body between its valve closing position and its valve open position only during a selected one of a transformation of the shape memory element in which it transfers from its undeformed rest state into its deformed tension state and a transformation of the shape memory element in which it transfers from its deformed tension state back into its undeformed rest state and the force deflecting device operating without the assistance of the shape memory element to maintain the valve body in both its valve closing position and its valve open position.

9. The appliance according to claim 8, wherein the force deflecting device converts a movement in an actuating direction of the shape memory element directly into a movement in oppositely directed directions of action.

10. The appliance according to claim 9, wherein the force deflecting device comprises a pivoted link guide.

11. The appliance according to claim 9, wherein the force deflecting device comprises a lever device.

12. The appliance according to claim 8, wherein the shape memory element is a memory metal.

13. The appliance according to claim 12, wherein current can be passed through the memory metal for heating the memory metal.

14. The appliance according to claim 12, wherein a heating resistor is used to control heating of the memory metal.

15. A method of controlling a valve system comprising:
moving a valve body between a valve closing position and a valve open position with a shape memory element, the shape memory element having the property that it will cycle through a transformation in which it transfers from an undeformed rest state into a deformed tension state and thereafter transfers from the deformed tension state back into the undeformed rest state; and
maintaining the valve body in both its valve closing position and its valve open position with a force deflecting device, the force deflecting device operating without the assistance of the shape memory element to maintain the valve body in both its valve closing position and its valve open position,
wherein the force deflecting device and the shape memory element cooperatively operate with one another to effect movement of the valve body between its valve closing position and its valve open position with the shape memory element assisting in a movement of the valve body between its valve closing position and its valve open position only during a selected one of a transformation of the shape memory element in which it transfers from its undeformed rest state into its deformed tension state and a transformation of the shape memory element in which it transfers from its deformed tension state back into its undeformed rest state.

16. The method according to claim 15, wherein the force deflecting device converts a movement in an actuating direction of the shape memory element directly into a movement in oppositely directed directions of action.

17. The method according to claim 16, wherein the force deflecting device comprises a pivoted link guide.

18. The method according to claim 16, wherein the force deflecting device comprises a lever device.

19. The method according to claim 15, wherein the shape memory element is a memory metal.

20. The method according to claim 19, wherein current can be passed through the memory metal for heating the memory metal.

21. The method according to claim 19, wherein a heating resistor is used to control heating of the memory metal.

* * * * *